United States Patent
Wicks

(10) Patent No.: US 7,882,825 B2
(45) Date of Patent: Feb. 8, 2011

(54) AIR INTAKE HEATER WITH FLANGED HEATING ELEMENT

(75) Inventor: Brian E. Wicks, Eden Prairie, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 0 days.

(21) Appl. No.: 12/568,808

(22) Filed: Sep. 29, 2009

(65) Prior Publication Data
US 2010/0018508 A1    Jan. 28, 2010

Related U.S. Application Data

(62) Division of application No. 11/381,207, filed on May 2, 2006, now Pat. No. 7,614,388.

(60) Provisional application No. 60/679,097, filed on May 9, 2005.

(51) Int. Cl.
F02M 31/00    (2006.01)
(52) U.S. Cl. ...................... 123/556; 123/549
(58) Field of Classification Search ............... 123/556, 123/549; 219/206, 207
See application file for complete search history.

(56) References Cited

U.S. PATENT DOCUMENTS

| | | |
|---|---|---|
| 2,791,990 A | 5/1957 | Grieb |
| 4,384,563 A | 5/1983 | Siefer et al. |
| 4,419,564 A | 12/1983 | Marcoux |
| 4,428,418 A | 1/1984 | Beasley et al. |
| 4,489,232 A * | 12/1984 | Wada et al. ............... 219/206 |
| 4,667,644 A | 5/1987 | Hori et al. |
| 4,685,437 A | 8/1987 | Tanaka et al. |
| 4,919,105 A | 4/1990 | Duelli |
| 5,038,742 A | 8/1991 | Uddin |
| 5,492,172 A | 2/1996 | Laveran et al. |
| 5,595,164 A | 1/1997 | Thimmesch |
| 5,743,242 A | 4/1998 | Thimmesch |
| 5,887,575 A | 3/1999 | Thimmesch et al. |
| 5,988,146 A | 11/1999 | Anderson et al. |
| 6,040,557 A | 3/2000 | Prust et al. |
| 6,242,712 B1 | 6/2001 | Prust |
| 6,259,060 B1 | 7/2001 | Prust |
| 6,325,053 B1 * | 12/2001 | Zappador et al. ............ 123/549 |
| 6,651,632 B2 | 11/2003 | Thimmesch et al. |
| 6,964,269 B2 | 11/2005 | Gschwind et al. |
| 7,064,293 B2 * | 6/2006 | Geiger et al. ............... 219/205 |

(Continued)

FOREIGN PATENT DOCUMENTS

DE    203 12 776    10/2003

(Continued)

*Primary Examiner*—M. McMahon
(74) *Attorney, Agent, or Firm*—Harness, Dickey & Pierce, P.L.C.

(57) ABSTRACT

An air heater for heating air entering a combustion chamber of an internal combustion engine is disclosed. The air heater includes a heating element having a substantially planar portion and a flange portion. The flange portion is positioned at an angle to the planar portion. The planar portion is positioned within an air flow at an upstream location relative to the flange portion. A structure is operable to position the heating element in communication with the air entering the combustion chamber of the engine. In addition, a thermal expansion joint for interconnecting a heating element and a frame is disclosed.

20 Claims, 8 Drawing Sheets

U.S. PATENT DOCUMENTS

| | | |
|---|---|---|
| 7,278,409 B2 * | 10/2007 | Carretero .................... 123/556 |
| 7,406,957 B2 * | 8/2008 | Betcher et al. ............... 123/556 |
| 2002/0096155 A1 | 7/2002 | Thimmesch et al. |
| 2004/0003800 A1 | 1/2004 | Gschwind et al. |
| 2005/0061796 A1 | 3/2005 | Higgins et al. |
| 2007/0039596 A1 | 2/2007 | Carretero |

FOREIGN PATENT DOCUMENTS

| | | |
|---|---|---|
| EP | 1 403 505 | 3/2004 |
| FR | 2 954 352 | 8/1987 |
| JP | 61 055356 | 3/1986 |
| JP | 61 101720 | 5/1986 |
| WO | WO 00/20751 | 4/2000 |

* cited by examiner

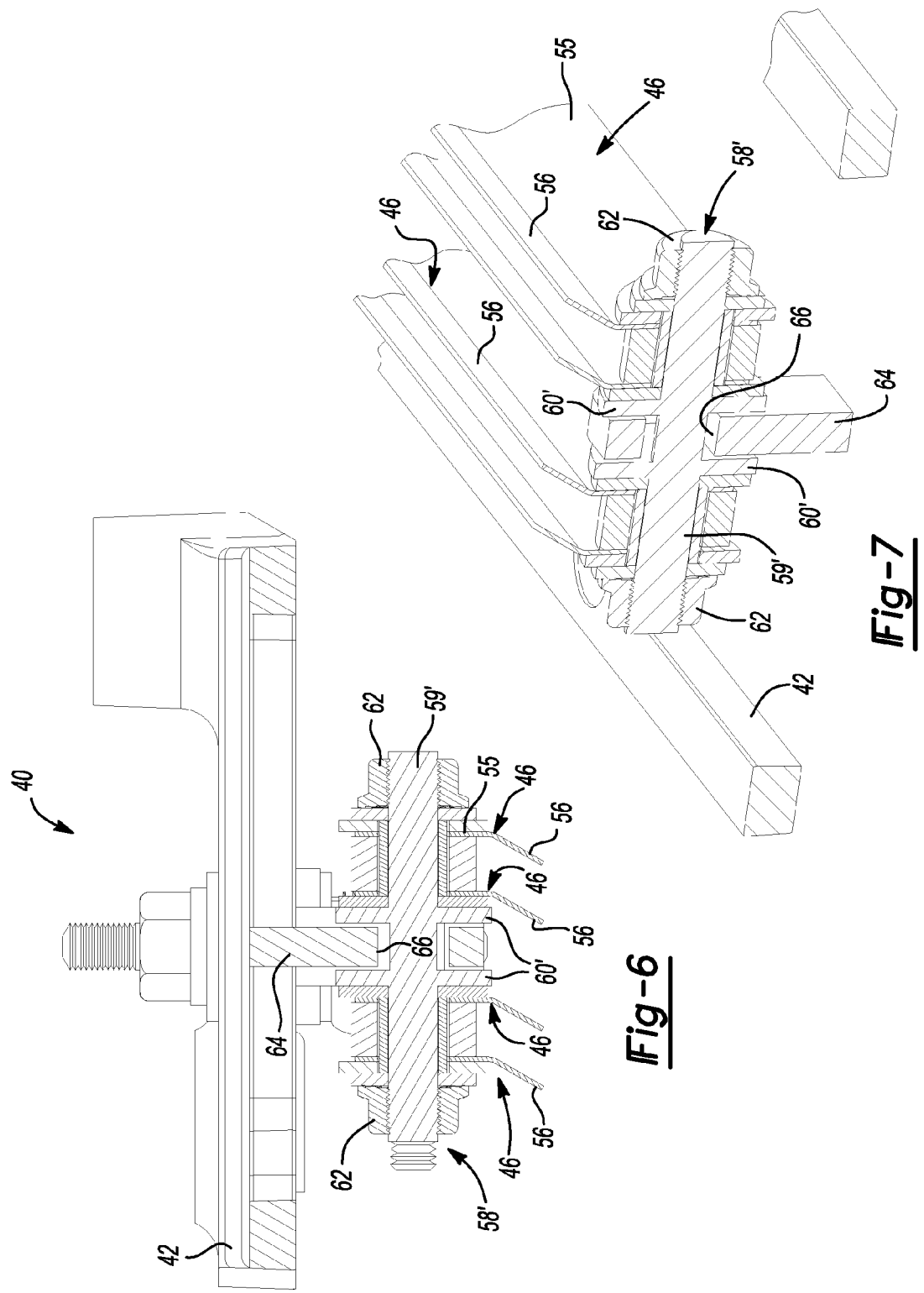

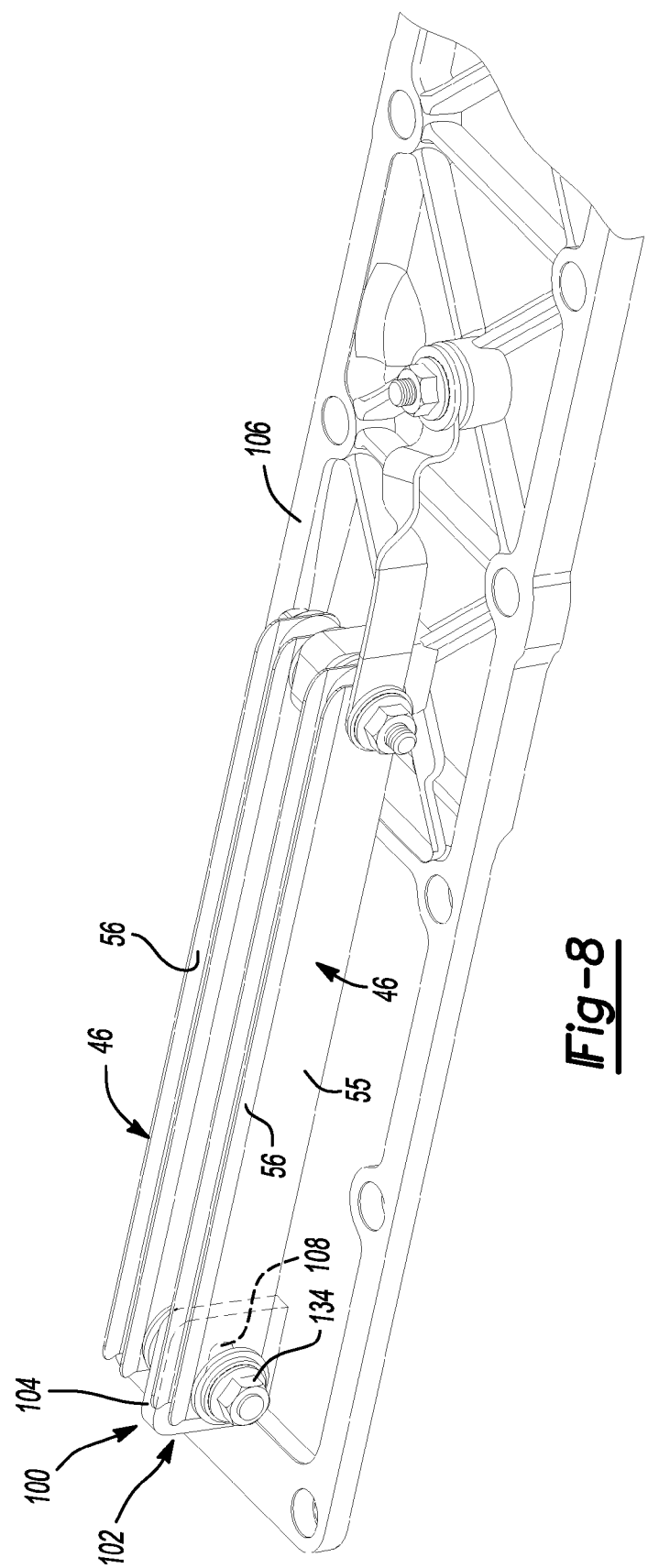

US 7,882,825 B2

AIR INTAKE HEATER WITH FLANGED HEATING ELEMENT

CROSS-REFERENCE TO RELATED APPLICATIONS

This application is a divisional of U.S. patent application Ser. No. 11/381,207 filed on May 2, 2006, which application claims the benefit of U.S. Provisional Application No. 60/679,097 filed on May 9, 2005. The disclosures of the above applications are incorporated herein by reference.

BACKGROUND

The present disclosure generally relates to air heaters for internal combustion engines. More particularly, the present disclosure relates to an air heater including a heating element having a flange or multiple flanges extending along its length. Furthermore, the present disclosure relates to a thermal expansion joint for interconnecting a plurality of stacked heating elements.

Air heaters may be used in automotive applications to heat air prior to entering a combustion chamber of an internal combustion engine. Typical air heaters include heating elements formed from substantially planar ribbons of metal that emit heat while an electrical current is passed therethrough. Because packaging an engine and its associated accessories within an engine compartment is becoming a great challenge, intake tube, intake manifold and internal combustion engine head geometry often times require the intake air flowing from outside of the vehicle to turn ninety degrees prior to entering the combustion chambers. Many times, the air intake heater is positioned at a location at or near the ninety degree bend. Accordingly, a need in the art exists to not only heat the air prior to entering the combustion chamber but also to redirect the air to optimize the flow of the air charge as it passes through the intake components and enters the combustion chambers.

Furthermore, it is common for the heating elements of the air heater to be energized for a period of time until the engine warms up and subsequently not energized for a relatively long period of time. This thermal cycling causes the heating elements to expand and contract amounts corresponding to the heating element's coefficient of thermal expansion. Depending on the manner in which the heating elements are mounted within the air heater, undesirable stresses may be imparted to the heating element during the thermal cycling. Accordingly, it is desirable to provide a thermal expansion joint which properly supports and mounts the heating elements within the air heater without inducing undesirable stress.

SUMMARY

The present disclosure provides an air heater for heating air entering a combustion chamber of an internal combustion engine. The air heater includes a heating element having a substantially planar portion and a flange portion. The flange portion is positioned at an angle to the planar portion. The planar portion is positioned within an air flow at an upstream location relative to the flange portion. A structure is operable to position the heating element in communication with the air entering the combustion chamber of the engine.

Furthermore, in another form, an air heater for heating air entering a combustion chamber of an internal combustion engine is described. The air heater includes a frame having an aperture extending therethrough. A heating element having first and second ends is positioned in communication with the aperture. A retainer couples the first end of the heating element to the frame. The retainer is operable to move relative to the frame to allow the heating element to thermally expand and contract during operation of the heater. It should be understood that the detailed description and specific examples, while describing the certain embodiments, are intended for purposes of illustration only and are not intended to limit the scope of the disclosure.

DRAWINGS

The present disclosure will become more fully understood from the detailed description and the accompanying drawings, wherein:

FIG. 6 is a partial fragmentary cross-sectional view taken through an exemplary thermal joint of the present disclosure;

FIG. 7 is a fragmentary sectional perspective view of the intake assembly of the present disclosure;

FIG. 8 is a perspective view of another alternate embodiment intake assembly;

DETAILED DESCRIPTION

The following description of the preferred embodiments is merely exemplary in nature and is in no way intended to limit the disclosure, its application, or uses.

Figure 1:
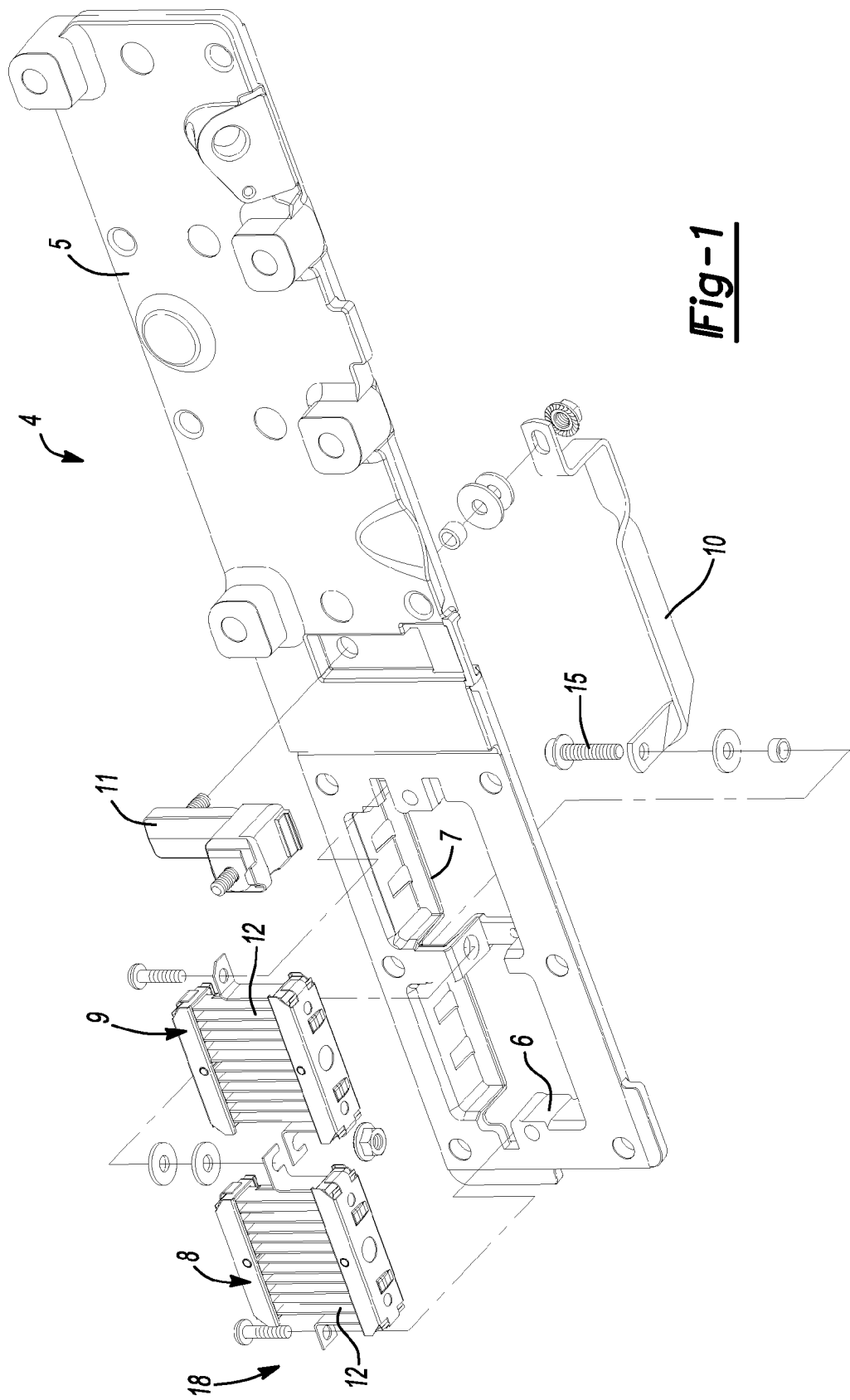
FIG. 1 is an exploded perspective view of an exemplary intake assembly constructed in accordance with the teachings of the present disclosure.
Figure 2:
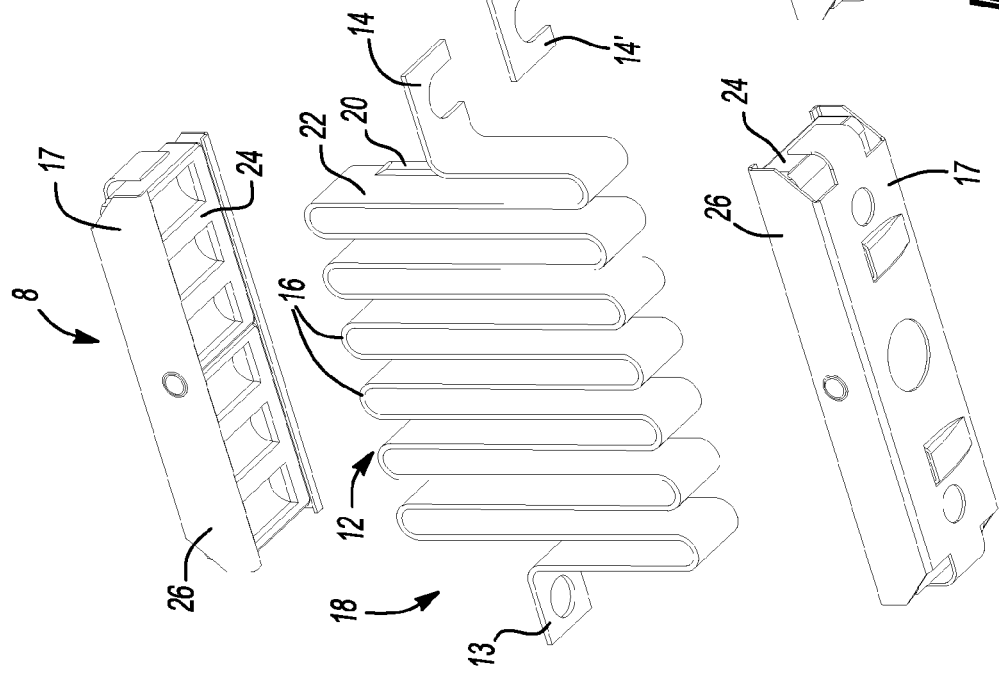
FIG. 2 is a partial exploded perspective view of the intake assembly of FIG. 1.
Figure 3:
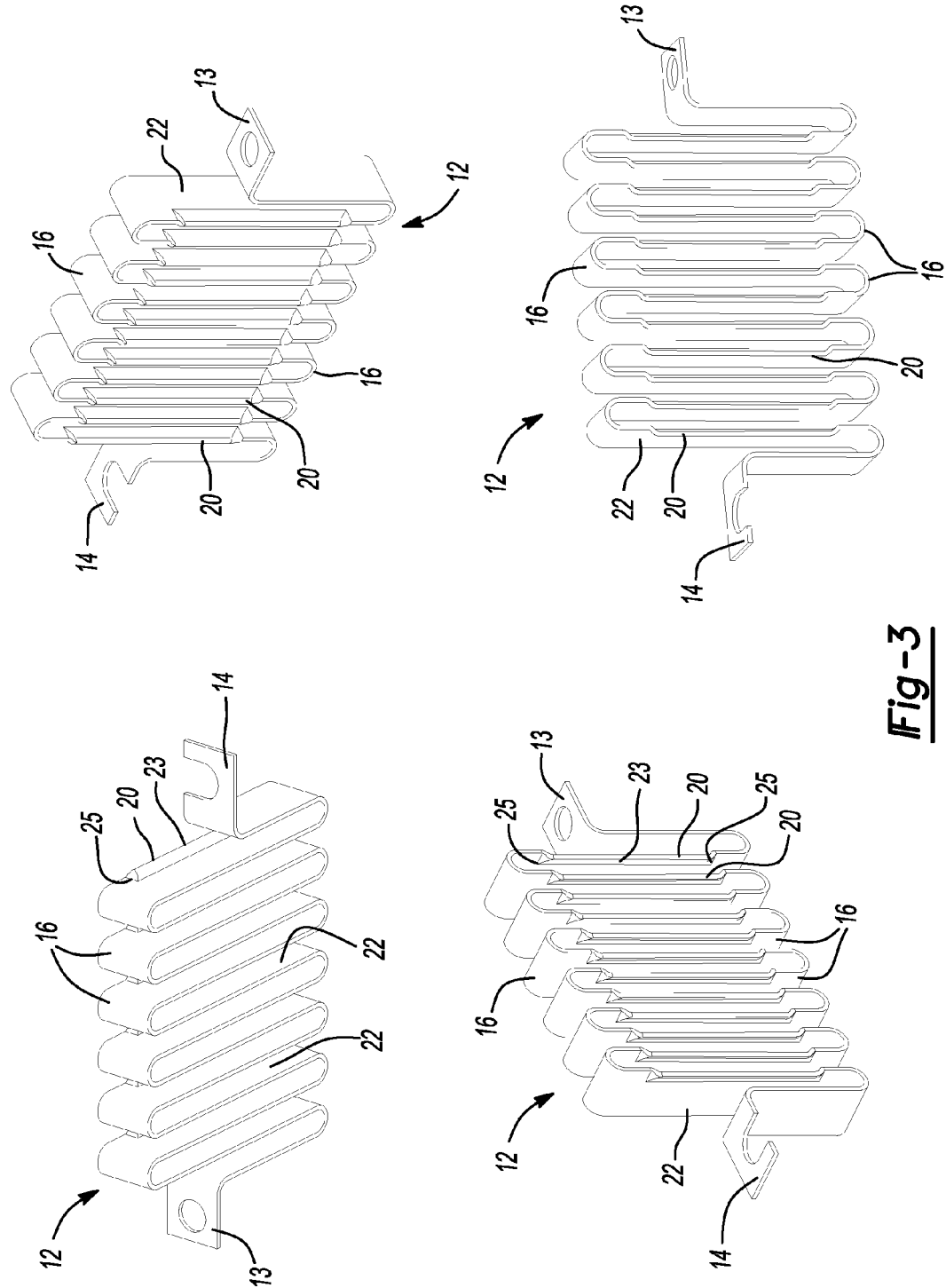
FIG. 3 depicts a heating element of the present disclosure in a number of perspective view.
Figure 4:
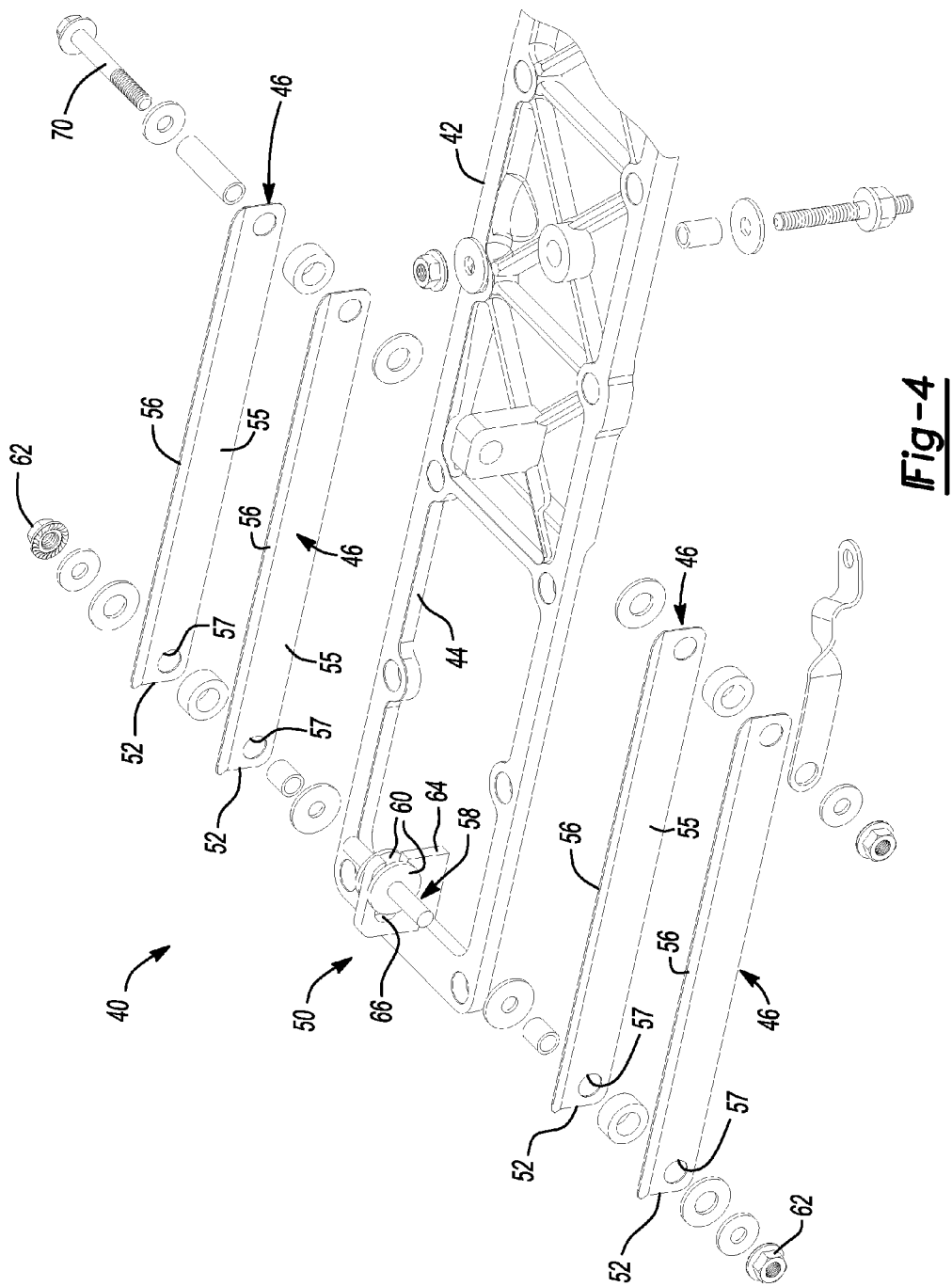
FIG. 4 is a partial fragmentary exploded perspective view of an alternate embodiment intake assembly.

FIGS. 1-3 relate to a first embodiment intake assembly 4 configured to mount to a head (not shown) of an internal combustion engine. An intake tube, also not shown, is typically mounted to a side of intake assembly 4 opposite the head. Effectively, intake assembly 4 is sandwiched between the intake tube and the head of the engine. Intake assembly 4 includes a cover plate 5 having a first through aperture 6 positioned adjacent to a second through aperture 7. A first heater subassembly 8 is positioned in aperture 6 and coupled to cover plate 5. A second heater subassembly 9 is coupled to cover plate 5 and positioned within aperture 7. Both heater subassemblies 8 and 9 are positioned within an air passageway for supplying air to the combustion cylinders of the internal combustion engine. A strap 10 electrically interconnects heater subassemblies 8 and 9 to a power connection assembly 11. As shown in FIG. 2, heater subassembly 8 and heater subassembly 9 are substantially similar to one another. Accordingly, only heater subassembly 8 will be described in greater detail.

Heater subassembly 8 includes a heating element 12 having a first end 13, a second end 14 and a plurality of convolutions 16 positioned between the first and second ends. Similar elements of heater subassembly 9 have been identified with like reference numerals including a "prime" suffix. First ends 13 and 13' are electrically coupled to plate 5. Second ends 14 and 14' are configured to be coupled to strap 10 by an electrical terminal 15 such that a current may be applied to heating element 12. Heating element 12 is typically mounted within a pair of holders 17 to support the heating element during operation.

As previously mentioned, the heating element and holder subassembly is positioned within an air passageway of an internal combustion engine to heat the intake air before it enters the combustion chamber. The direction of air flow is indicated by arrow 18 in the figures. The air flow travels across the width of a plurality of substantially planar portions 22. Heating element 12 also includes a plurality of upset or flanged portions 20. Each flanged portion 20 is positioned at one edge of heating element 12 adjacent to planar portions 22. The upset portions 20 longitudinally extend along a majority of the length of substantially planar element portions 22. Each flange portion includes a body 23 being connected to one of planar portions 22 by two end portions 25. It is contemplated that the flanged portions 20 are formed during a low-cost stamping operation during the manufacture of each heating element 12. Accordingly, it should be appreciated that heating element 12 is a contiguous, one-piece component having the flange portions and the planar portions integrally formed with one another.

Flanges 20 aid in directing the air flow and providing element rigidity to minimize element movement under thermal cycling. Engine temperature testing has indicated that the thermal distribution of heat in the air charge prior to the engine cranking is improved by the additional of flanges 20. Additionally, each flange 20 assists in changing the direction of the air flow from traveling in a first direction within an air intake tube (not shown) to a direction 90 degrees therefrom to enter the cylinders. Current trends in intake manifold and intake tube design are that the space in which the air is allowed to make a 90 degree turn is substantially reduced. The present disclosure assists in not only heating the intake air but also changing the direction of the air flow.

Each heating element 12 is electrically coupled to a number of components of intake assembly 4 and electrically insulated from the remainder. As such, a variety of the components used to construct intake assembly 4 are specified to perform either an electrical insulating or an electrical conducting function. For example, each holder assembly includes insulators 24 captured within a housing 26. Further, other electrically insulating components such as washers and/or sleeves may be used to assure a proper electrical path is maintained through intake assembly 4.

FIGS. 4-10 relate to a second embodiment intake assembly 40. Intake assembly 40 includes a cover plate 42 configured to be positioned between an intake tube and an internal combustion head as previously described in relation to intake assembly 4. Cover pate 42 includes an aperture 44 in communication with an air passageway providing air flow to the combustion chambers of the internal combustion engine. Heating elements 46 are shown working in cooperation with a thermal expansion joint 50. Joint 50 is operable to interconnect ends 52 of substantially linearly extending, parallel and spaced apart heating elements 46. The figure depicts each heating element 46 including a substantially planar portion 55 and a flange 56.

Thermal expansion joint 50 includes a shoulder bolt 58 extending through apertures 57 formed in each of heating elements 46. Shoulder bolt 58 includes two flanges 60. A number of conducting and insulating washers may be placed between flanges 60 of shoulder bolt 58 and nuts 62 threadingly engaged with the ends of shoulder bolt 58 to properly define the electrical current path through each of the heating elements 46. Cover plate 42 includes a support 64 having an elongated aperture or slot 66 in receipt of shoulder bolt 58. Shoulder bolt 58 is free to axially translate within slot 66 during operation. This is accomplished by the use of shoulder bolt 58 instead of a standard threaded fastener. Specifically, nuts 62 clamp the heating elements and washers against flanges 60. In this manner, a compressive force is not placed on support 64 but the heating elements are captured on the shank of shoulder bolt 58. Therefore, a sliding fit between shoulder bolt 58 and slot 66 allows heating elements 46 to expand and contract during operation without adding undesirable stress to the heating elements as would be the case if they were fixed at both ends. Because support 64 includes slot 66 at one end, the opposite end of heating elements 46 are rigidly mounted to a structure using a standard threaded fastener 70.

Figure 5:
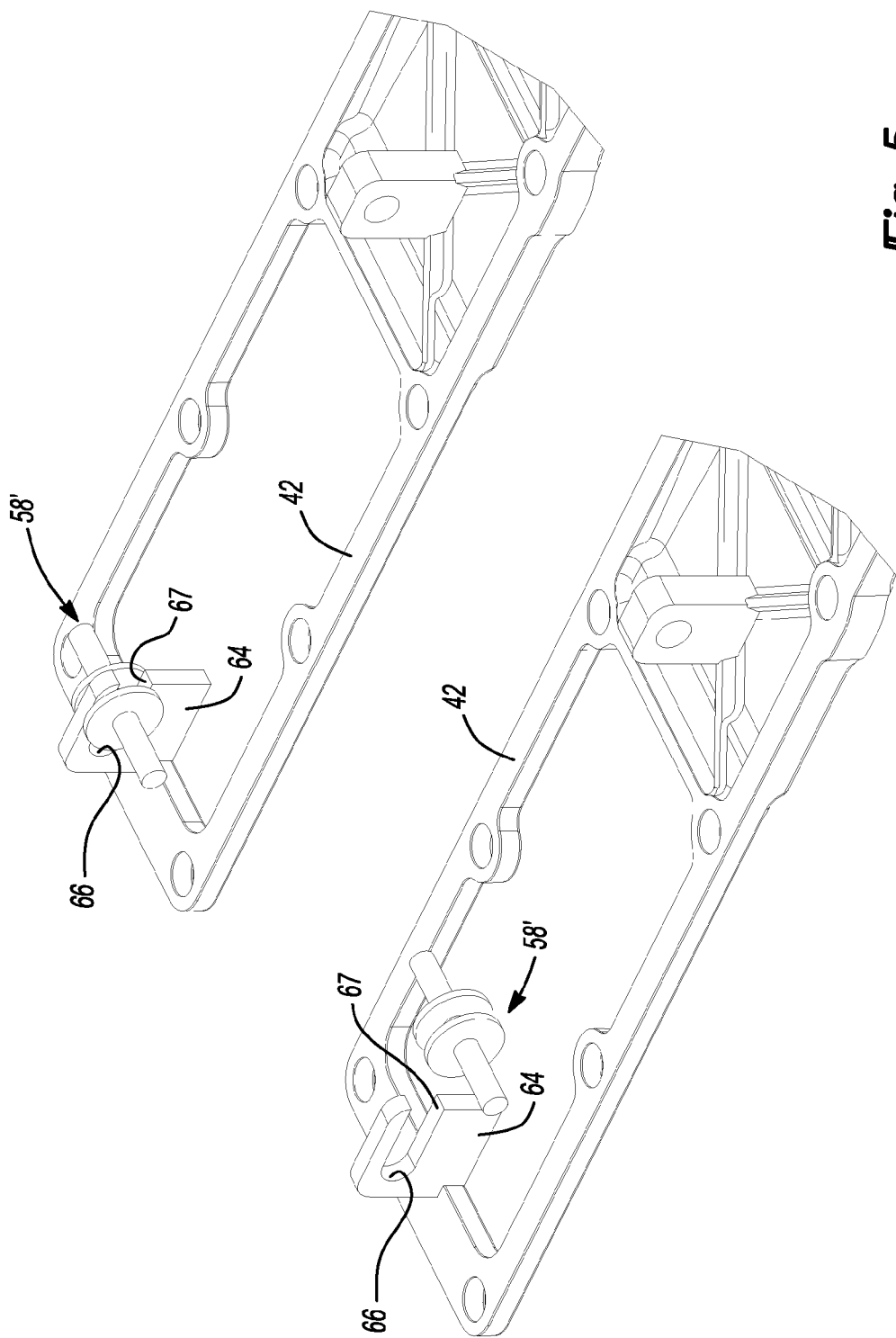
FIG. 5 depicts partial fragmentary perspective view of another alternate embodiment intake assembly.

In another embodiment, the elongated aperture 66 is configured as an open slot 67 as shown in FIG. 5. In this manner a shoulder bolt 58' may be constructed as a one-piece component as depicted in FIGS. 6 and 7. In particular, slot 67 extends a sufficient length to assure that shoulder bolt 58' remains within slot 67 regardless of the temperature of heating element 46. One-piece shoulder bolt 58' includes a shank portion 59' having integrally formed flanges 60' spaced apart from one another.

Figure 10:
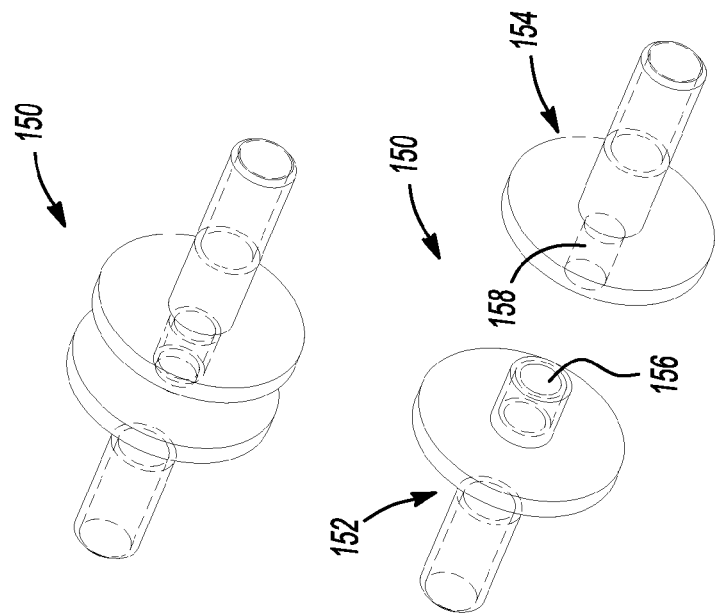
FIG. 10 depicts an assembled perspective and an exploded perspective view of an alternate embodiment shoulder bolt.
Figure 9:
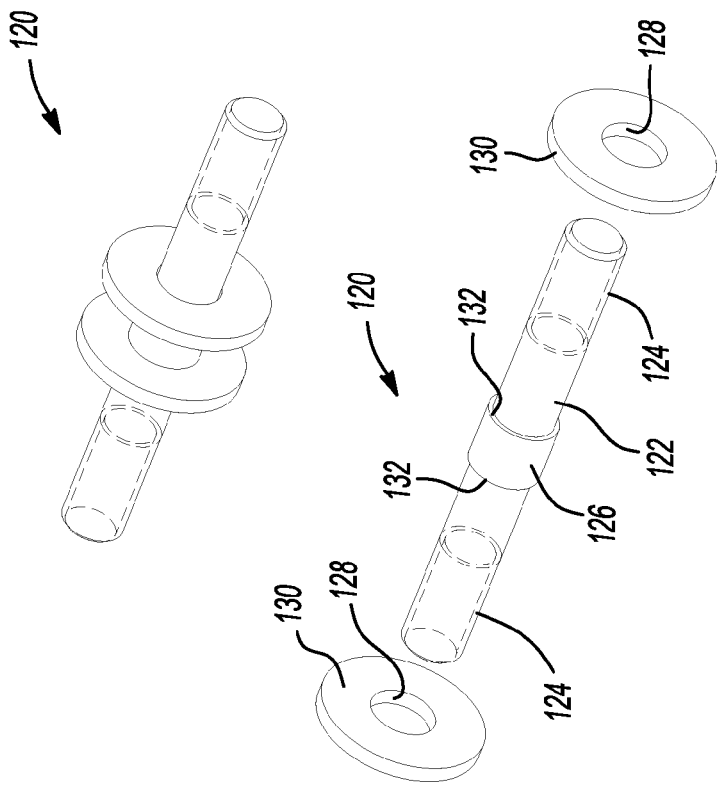
FIG. 9 depicts an assembled view and an exploded perspective view of an alternate embodiment shoulder bolt.

FIGS. 8-10 relate to another alternate embodiment intake assembly 100. Intake assembly 100 is substantially similar to intake assembly 40 with the exception of variations to the thermal expansion joint. Accordingly, like elements will retain their previously introduced reference numerals. Intake assembly 100 includes a thermal expansion joint 102 having a support 104 integrally formed with a cover plate 106. Support 104 includes an elongated aperture 108 formed as a closed slot.

FIGS. 9 and 10 depict alternate embodiment shoulder bolts configured as multi-piece assemblies to extend through closed slot 108. A shoulder bolt assembly 120 (FIG. 9) includes a stepped shaft 122 having externally threaded portions 124 on each end. A center section 126 defines an increased outer diameter that is greater in size than apertures 128 extending through washers 130. Center section 126 is sized to axially slide within close slot 108 and provide the thermal expansion relief described in relation to the previous embodiments. Center section 126 defines a pair of shoulders 132 operable to react load from nuts 134 thereby clamping heating elements 46 between shoulders 132 and nuts 134. This arrangement assures that a clamping load is not exerted on support 104 to allow the function previously described.

FIG. 10 depicts another alternate embodiment shoulder bolt assembly 150. Shoulder bolt assembly 150 includes a first headed shaft 152 and a second headed shaft 154. First headed shaft 152 includes an internally threaded aperture 156 in selective receipt of an externally threaded stub 158 formed on second headed shaft 154. The two-piece assembly shown in FIG. 10 is operable for use with closed slot 108 and provides a means for supporting heating elements 46 with a thermal expansion joint.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without department from the spirit and scope of the disclosure as defined in the following claims.

What is claimed is:

1. An air heater for heating air entering a combustion chamber of an internal combustion engine, the air heater comprising:

a heating element having a substantially planar portion and a flange portion, said flange portion being positioned at an angle to said planar portion, said planar portion being positioned within an air flow at an upstream location relative to said flange portion; and a structure to position said heating element in communication with the air entering the combustion chamber of the engine, wherein said heating element includes a plurality of 180 degree bends and a plurality of planar portions positioned between said bends, said heating element further including a plurality of flange portions positioned adjacent said plurality of planar portions, wherein said planar portions are spaced apart from and positioned substantially parallel to one another.

2. The air heater of claim 1 wherein said flange portion is substantially planar.

3. The air heater of claim 2 wherein said heating element includes a plurality of 180 degree bends and a plurality of planar portions positioned between said bends, said heating element further including a plurality of flange portions positioned adjacent said plurality of planar portions, wherein said planar portions are spaced apart from and positioned substantially parallel to one another.

4. The air heater of claim 1 wherein said flange portions are spaced apart from and positioned substantially parallel to one another.

5. The air heater of claim 1 wherein said heating element is a one-piece monolithic component having said flange portion integrally formed with said planar portion.

6. The air heater of claim 5 wherein said flange portion extends less than a full length of said planar portion and includes a body interconnected at its ends to said planar portion by end portions extending at an angle from said planar portions.

7. The air heater of claim 5 further including another heating element spaced apart from said heating element, said another heating element having a flange portion and a planar portion, said planar portion of said heating element and said planar portion of said another heating element being positioned substantially parallel to one another.

8. The air heater of claim 3 wherein said structure includes first and second spaced apart holders supporting said heating element therebetween.

9. The air heater of claim 8 wherein said structure includes insulators being retained by said first and second holders, said insulators including pockets in receipt of said heating element bends.

10. An air heater for heating air entering a combustion chamber of an internal combustion engine, the air heater comprising:

a one-piece heating element positioned within an air flow, said heating element having a substantially planar portion and an upset portion, said upset portion extending at an angle to said planar portion along a trailing edge of said heating element; and a structure coupled to said heating element, said structure being operable to maintain the position of said heating element in communication with the air entering the combustion chamber of the engine wherein said structure includes a plate adapted to be positioned between an engine head and an intake tube of the engine, said plate including a stanchion and a fastener attaching said heating element to said stanchion, wherein said fastener and stanchion are configured to allow relative movement therebetween when said heating element increases in length as a temperature of said heating element increases.

11. The air heater of claim 10 wherein said structure includes a plate adapted to be positioned between an engine head and an intake tube of the engine.

12. The air heater of claim 11 wherein said plate includes a stanchion and a fastener attaching said heating element to said stanchion.

13. The air heater of claim 12 wherein said fastener and stanchion are configured to allow relative movement therebetween when said heating element increases in length as a temperature of said heating element increases.

14. The air heater of claim 13 wherein said stanchion includes a slot in receipt of said fastener.

15. The air heater of claim 10 wherein said heating element includes a plurality of 180 degree bends and a plurality of planar portions positioned between said bends, said heating element further including a plurality of upset portions positioned adjacent said plurality of planar portions, wherein said planar portions are spaced apart from and positioned substantially parallel to one another.

16. The air heater of claim 15 wherein said structure includes first and second spaced apart holders supporting said heating element therebetween.

17. The air heater of claim 16 wherein said structure includes insulators being retained by said first and second holders, said insulators including pockets in receipt of said heating element bends.

18. The air heater of claim 10 wherein said upset portion is substantially planar.

19. The air heater of claim 10 wherein said upset portion is positioned to change the direction of air flow across the heating element.

20. The air heater of claim 19 wherein said upset portion increases a thermal distribution of heat generated by said heating element.

* * * * *

UNITED STATES PATENT AND TRADEMARK OFFICE
CERTIFICATE OF CORRECTION

Page 1 of 1

PATENT NO. : 7,882,825 B2
APPLICATION NO. : 12/568808
DATED : February 8, 2011
INVENTOR(S) : Brian E. Wicks It is certified that error appears in the above-identified patent and that said Letters Patent is hereby corrected as shown below:

| | |
|---|---|
| Column 5, Lines 17-23: | Claim 3 should be deleted |
| Column 6, Lines 16-25: | Claims 11-13 should be deleted |
| Column 6, Line 26: | "13 should be --10--. |

Signed and Sealed this

Thirteenth Day of December, 2011

David J. Kappos
*Director of the United States Patent and Trademark Office*